United States Patent
Cox

(10) Patent No.: US 6,273,460 B1
(45) Date of Patent: Aug. 14, 2001

(54) SMART REMOTE INDICATOR MODULE

(75) Inventor: John D. Cox, Shelby Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/321,000

(22) Filed: May 27, 1999

(51) Int. Cl.$^7$ ................................................ B60R 21/32
(52) U.S. Cl. ................................................ 280/735; 307/10.1
(58) Field of Search ........................... 280/735; 340/438, 340/457; 307/10.1

(56) References Cited

U.S. PATENT DOCUMENTS

| | | | |
|---|---|---|---|
| 5,338,063 | * 8/1994 | Takeuchi et al. | 280/735 |
| 5,413,378 | * 5/1995 | Steffens, Jr. et al. | 280/735 |
| 5,428,340 | 6/1995 | Kawabata et al. . | |
| 5,482,314 | 1/1996 | Corrado et al. . | |
| 5,544,914 | 8/1996 | Borninski et al. . | |
| 5,570,903 | 11/1996 | Meister et al. . | |
| 5,590,904 | * 1/1997 | Ellis et al. | 280/735 |
| 5,653,462 | * 8/1997 | Breed et al. | 280/735 |
| 5,690,356 | 11/1997 | Lane, Jr. . | |
| 5,709,404 | * 1/1998 | Brooks | 280/735 |
| 5,721,527 | 2/1998 | Simmons et al. . | |
| 5,732,375 | 3/1998 | Cashler . | |
| 5,794,972 | 8/1998 | Katzin . | |
| 5,803,491 | 9/1998 | Barnes et al. . | |
| 5,804,887 | * 9/1998 | Holzapfel et al. | 307/10.1 |
| 5,816,611 | 10/1998 | Parn . | |
| 5,879,024 | * 3/1999 | Estep | 280/735 |
| 5,892,433 | * 4/1999 | Fulda | 340/438 |
| 5,918,899 | * 7/1999 | Watanabe | 280/735 |
| 5,964,815 | * 10/1999 | Wallace et al. | 307/10.1 X |
| 5,992,880 | * 11/1999 | Cuddiby et al. | 280/735 |
| 6,040,637 | * 3/2000 | Pananini et al. | 307/10.1 |
| 6,043,566 | * 3/2000 | Bryant et al. | 307/10.1 |
| 6,045,156 | * 4/2000 | Spell et al. | 280/735 |
| 6,164,693 | * 12/2000 | Mattes et al. | 280/735 |
| 6,189,923 | * 2/2001 | Tsubone | 280/735 |

FOREIGN PATENT DOCUMENTS

99/49160 * 9/1999 (WO) .

* cited by examiner

*Primary Examiner*—Brian L. Johnson
*Assistant Examiner*—Bryan Fischmann
(74) *Attorney, Agent, or Firm*—Roland A. Fuller, III

(57) ABSTRACT

A vehicle occupant restraint system having a base system and a supplemental system is provided. The base system includes an air bag module and an occupant restraint controller. In the absence of the supplemental system, the occupant restraint controller operates in a default mode wherein the air bag module is enabled. Coupling the supplemental system to the base system permits the air bag module to be selectively disabled. The supplemental system transmits a plurality of signals to indicate whether the air bag module is to be disabled or enabled. When the occupant restraint controller receives a signal indicating that the air bag module is to be disabled, the occupant restraint controller inhibits the generation of squib pulses which would cause the air bag module to actuate.

4 Claims, 2 Drawing Sheets

SMART REMOTE INDICATOR MODULE

BACKGROUND OF THE INVENTION

1. Technical Field

The present invention relates generally to airbag module control systems and more particularly to an electronic controller for an airbag module control system.

2. Discussion

Modern vehicles are typically equipped with one or more airbags which are controlled by an electronic controller. The electronic controller analyzes data received from a variety of sensors located throughout the vehicle and determines whether to inflate the airbag and in some systems, the rate at which the airbag should be inflated. Despite the significant benefits derived generally from the use of such airbag modules, there are circumstances under which an airbag should not be deployed.

Several control systems have been developed to automatically determine when such circumstances exist. These control systems typically rely on a plurality of sensors to detect or quantify a plethora of variables which are employed in an attempt to quantify the relationship between a seating area and the person or object placed in the seating area. Such systems have not been received with commercial acceptance due to their cost, inability to completely identify all situations in which an air bag module should not be deployed and/or the extreme difficulty incurred to incorporate them into a vehicle after it has been manufactured. Consequently, many consumers simply prefer a system which permits one or more air bag modules to be selectively disabled.

The disabling systems known in the art have relied on a switch which mechanically breaks or interrupts the squib circuit used to initiate the inflation of an air bag. Despite the apparent success of such systems, several drawbacks are apparent.

Several of these drawbacks relate to the mechanical interruption of the electronic squib circuit and the effect this has on the integrity and reliability of the air bag module. Such drawbacks include the potential for error when installing the switch, the inability to detect failed or burned out indicators and the inability of the air bag controller to perform diagnostics on all new circuits.

Another significant drawback relates to the use of such system with sophisticated, multi-stage air bag modules. Modern, sophisticated air bag modules utilize inflators which typically employ two or more squib circuits, each of which are deployable independently of the others. Deployment of the squib circuits is controlled according to a deployment methodology which generally tailors the deployment rate (i.e., inflation rate) to the magnitude of the collision.

Consequently, where multiple squib circuits are utilized, mechanical disablement of the squib circuits would require several switches. In such a system, effectively disabling an air bag module would require that all of the switches be set to mechanically interrupt their respective squib circuits; a failure to set a single switch correctly would prevent the air bag module from functioning as had been intended.

Accordingly, there remains a need in the art for a vehicle occupant restraint system which permits air bag modules having two or more squib circuits to be disabled in a convenient and reliable manner. There also remains a need in the art for a vehicle occupant restraint system which can be easily and reliably upgraded with controls permitting the vehicle occupants to selectively disable one or more air bag modules.

SUMMARY OF THE INVENTION

It is therefore one object of the present invention to provide a vehicle occupant restraint system which may be easily and reliably upgraded to permit one or more of the system air bag modules to be disabled.

It is another object of the present invention to provide a vehicle occupant restraint system which permits one or more of the system air bag modules to be disabled without effecting the system diagnostic capabilities.

It is a further object of the present invention to provide a vehicle occupant restraint system which permits the system air bags to be disabled in a manner which does not mechanically interrupt the system squib circuits.

The vehicle occupant restraint system of the present invention includes a base system and a supplemental system. The base system includes an air bag module and an occupant restraint controller. In the absence of the supplemental system, the occupant restraint controller operates in a default mode wherein the air bag module is enabled. Coupling the supplemental system to the base system permits the air bag module to be selectively disabled. The supplemental system transmits a plurality of signals to indicate whether the air bag module is to be disabled or enabled. When the occupant restraint controller receives a signal indicating that the air bag module is to be disabled, the occupant restraint controller inhibits the generation of squib pulses which would cause the air bag module to actuate.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
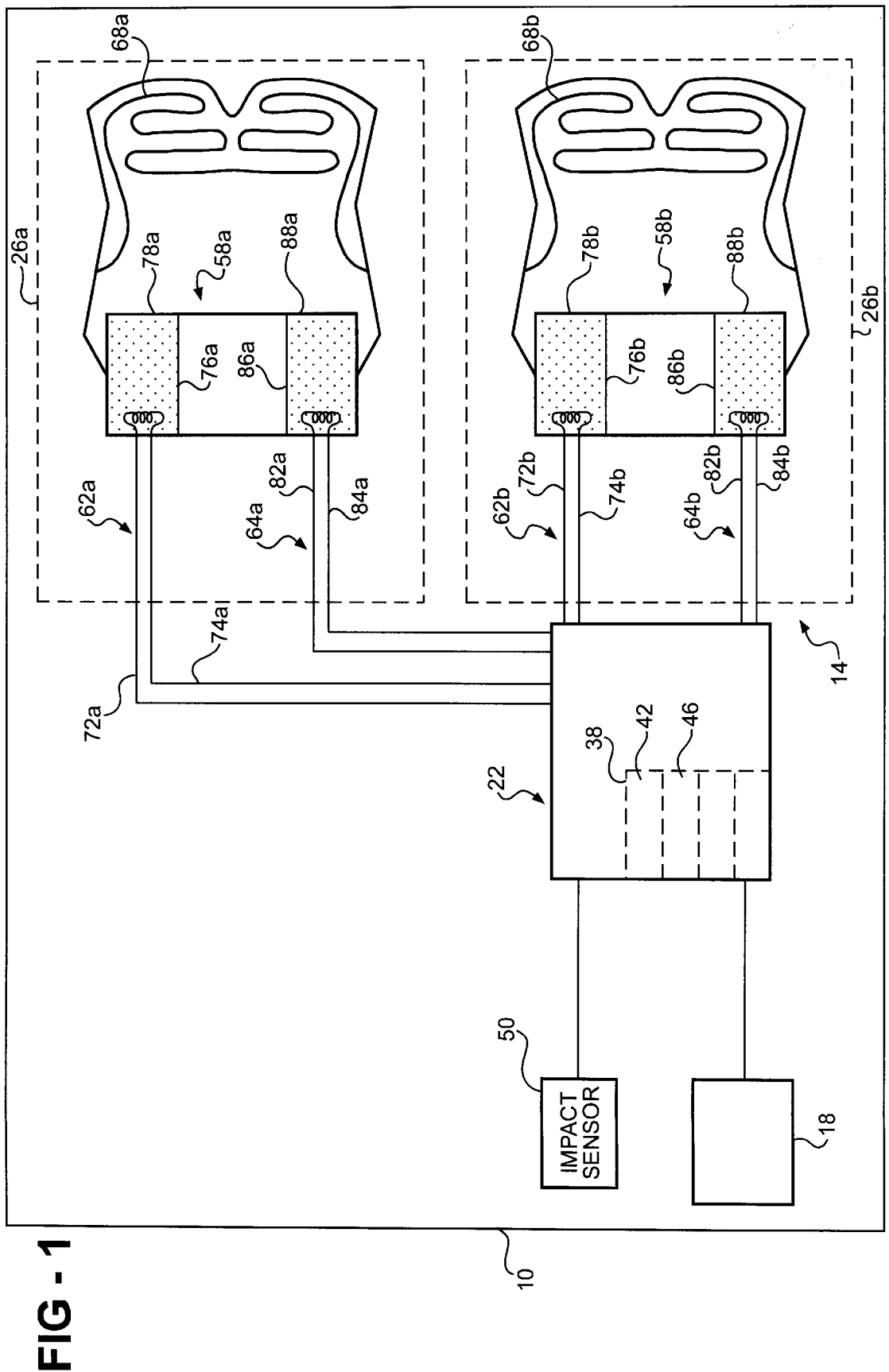
FIG. 1 is a schematic diagram of a vehicle occupant restraint system constructed in accordance with the teachings of the present invention.
Figure 2:
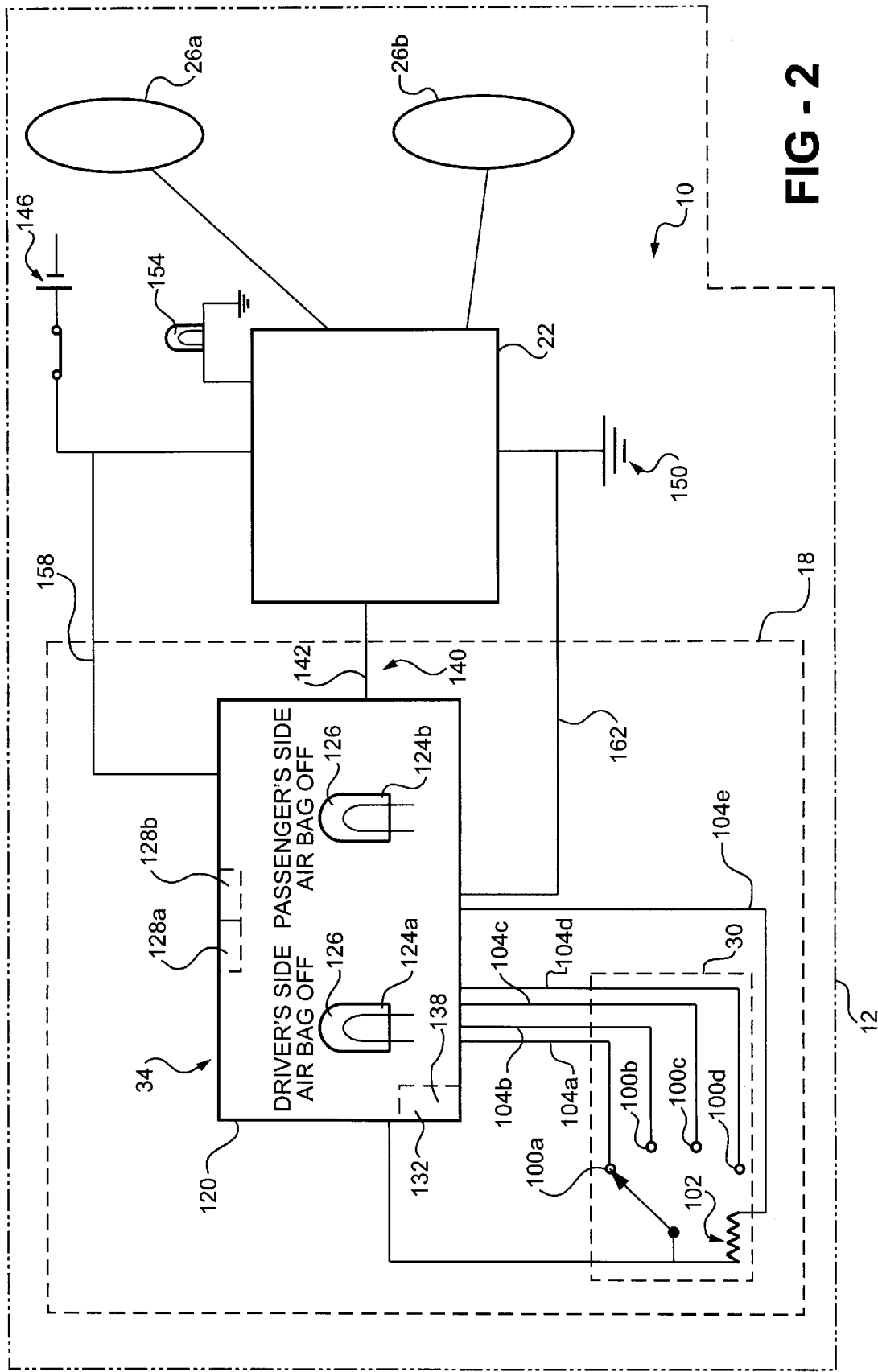
FIG. 2 is an enlarged view of a portion of the schematic diagram shown in FIG. 1.

Referring to FIGS. 1 and 2 of the drawings, the vehicle occupant restraint system of the present invention is generally indicated by reference numeral 10. Those skilled in the art will readily understand that the vehicle occupant restraint system 10 is intended to be integrated into a vehicle 12, which is only shown schematically in FIG. 2, and as such, a detailed discussion of the remainder of the vehicle 12 is neither within the scope of this disclosure nor necessary for practicing the present invention. The vehicle occupant restraint system 10 includes a base system 14 and a supplementary system 18 operable for selectively disabling all or part of the base system 14. The base system 14 includes an occupant restraint controller 22 and a plurality of multi-stage air bag modules 26. The supplementary system 18 includes a switch unit 30, and a remote indicator module 34.

The occupant restraint controller 22 includes a microprocessor 38, memory 42, and a timer 46. The occupant restraint controller 22 is operable for monitoring the electrical integrity of the base system 14 through periodic diagnostic monitoring, as well as for initiating and controlling the deployment of the plurality of air bag modules 26. The occupant restraint controller 22 is coupled to various vehicle sensors such as impact sensor 50, which permit the occupant restraint controller 22 to monitor various vehicle dynamics in order to determine the occurrence and severity of a collision.

As each of the multi-stage air bag modules 26a and 26b is similarly constructed, only air bag module 26a will be discussed in detail. Those skilled in the art will understand, however, that air bag module 26b includes similar or corresponding elements to the elements of air bag module 26a. Accordingly, the similar or corresponding elements of air bag module 26b are identified by the same reference numerals as used to describe the elements of air bag module 26a, except that the reference numerals for the air bag module 26b include a "b" suffix.

Air bag module 26a includes an inflator 58a, first and second squib circuits 62a and 64a, respectively, and an air bag 68a. It will be understood, however, that the present invention has applicability to air bag modules of various other configurations and as such, the scope of the present invention is not limited to air bag modules having two squib circuits. The first squib circuit 62a includes a negative circuit element 72a, a positive circuit element 74a and a first squib 76a which is coupled to the inflator 58a proximate a first charge 78a. The negative and positive circuit elements 72a and 74a electrically couple the first squib 76a to the occupant restraint controller 22. The second squib circuit 64a includes a negative circuit element 82a, a positive circuit element 84a and a second squib 86a which is coupled to the inflator 58a proximate a second charge 88a. The negative and positive circuit elements 82a and 84a electrically couple second squib 86a to the occupant restraint controller 22.

When it becomes necessary to deploy an air bag, such as the air bag 68a for example, the occupant restraint controller 22 generates a series of squib pulses according to a predetermined deployment method. A detailed description of deployment methodology is beyond the scope of the present invention and need not be provided herein. Briefly, the squib pulses are selectively generated to deploy the air bag 68a at a predetermined deployment rate consistent with the various dynamics, including the magnitude and duration of the impact.

Generation of a first squib pulse causes the first squib 76a to heat and ignite the first charge 78a. Combustion of the first charge 78a produces a first volume of gas which is directed into the air bag 68a causing it to inflate at a first rate. Generation of a second squib pulse causes the second squib 86a to heat and ignite the second charge 88a. Combustion of the second charge 88a produces a second volume of gas which is directed into the air bag 68a causing it to inflate at a second rate. As one skilled in the art may appreciate, the generation of the first and second squib pulses may be controlled by the occupant restraint controller 22 so as to optimize for a given collision the timing of the airbag inflation, as well as the rate at which the air bag 68a is inflated. As one skilled in the art may also appreciate, the first and second charges 78a and 88a may be sized differently (i.e., non-equally) to further optimize the performance of the air bag module 26a.

In the absence of the supplementary system 18, occupant restraint controller 22 operates in a default mode wherein each of the plurality of air bag modules are enabled for deployment. The incorporation of the supplementary system 18 into the vehicle occupant restraint system 10 permits a vehicle operator to selectively disable one or more of the plurality of air bag modules 26.

The switch unit 30 of the supplementary system 18 is positionable at a plurality of predetermined switch positions 100 which permit the vehicle occupants to selectively enable or disable one or more of the plurality of air bag modules 26.

The switch unit 30 preferably includes an identification resistor 102 which permits the switch unit 30 to produce a switch-type signal. The magnitude of the resistance of identification resistor 102 is varied according to the type of switch utilized and/or the specific air bag modules 26 which are permitted to be selectively disabled. As illustrated, for example, the switch unit 30 includes an identification resistor 102 having a first resistance value of approximately 88.7 ohms which causes the switch-type signal to acheive a first voltage. Where a different switch unit 30 is used, such as a two-position switch used to selectively disable only the driver side air bag module (i.e., air bag module 26a), an identification resistor 102 of a second resistance value, 357 ohms for example, is incorporated into the switch unit 30 and causes the switch-type signal to acheive a second voltage. Where another switch 30 is used, such as a two-position switch to selectively disable only the passanger side air bag module (i.e., air bag module 26b), an identification resistor 102 of a third resistance value, 178 ohms for example, is incorporated into the switch unit 30 and causes the switch-type signal to acheive a third voltage.

The switch unit 30 preferably produces a predetermined discrete output signal indicative of its placement at a given switch position 100. In the example illustrated, switch unit 30 is operable in four switch positions 100a, 100b, 100c and 100d which produce a discrete output signal to wires 104a, 104b, 104c and 104d, respectively. Alternatively, switch unit 30 could comprise a resistive multiplexed switch (not shown) which produces a single output signal whose magnitude varies according to the switch position 100.

The remote indicator module 34 is a microprocessor controlled, data storing indicator which is preferably mounted in the instrument panel of a vehicle. The remote indicator module 34 includes a water-resistant housing 120, a pair of indicator lamps 124a and 124b (each of which is preferably a light-emitting diode 126), a pair of lamp drivers 128a and 128b operable for selectively powering lamps 124a and 124b, respectively, and a microprocessor 132 having memory 136 and a flash EEPROM 138. The memory 136 permits the microprocessor to log faults and store data and the flash EEPROM 138 permits the microprocessor to be programmed with special instructions which are unique to a given vehicle or base system 14. These special instructions preferably include the air bag modules which may be selectively disabled (e.g., driver's air bag module 26a only, passanger's air bag module 26b only, both air bag modules 26a and 26b). Consequently, the remote indicator module 34 may be readily employed in a wide range of vehicles.

The remote indicator module 34 is coupled to switch unit 30 through the wires 104a, 104b, 104c, 104d and 104e. The wires 104a, 104b, 104c and 104d transmit the discrete output signal produced by switch positions 100a, 100b, 100c and 100d, respectively, to the remote indicator module 34. The wire 104e transmits the switch-type signal from the switch unit 30 to the remote indicator module 34. The switch-type signal permits the remote indicator module 34 to identify the air bag module or modules 26 which may be selectively disabled. The remote indicator module 34 evaluates the discrete output signal from the switch unit 30 and determines if the switch position 100 identified by the remote indicator module 34 is a valid position. The switch-type signal therefore prevents the disabling of an air bag module 26 where the switch unit 30 has not been coupled to the remote indicator module 34 in a correct manner or where an unauthorized or incorrect switch unit is employed.

The remote indicator module 34 is coupled to the occupant restraint controller 22 through a link 140 which permits the switch position 100 to be communicated to the occupant restraint controller 22. Preferably, the link 140 is a serial link 142, such as an S.A.E. J1850 data bus, which facilitates two-way communication between the occupant restraint controller 22 and the remote indicator module 34. This permits, for example, the occupant restraint controller 22 to send the remote indicator module 34 a message or signal to dim lamps 124a and 124b where the vehicle operator has switched on the vehicle headlights. The remote indicator module 34 is also coupled to the vehicle electric source, such as a battery 146, and the vehicle ground 150.

The remote indicator module 34 is operable for monitoring the discrete output signals generated by the switch unit 30, controlling the illumination of lamps 124a and 124b in response thereto and sending a message or signal to the occupant restraint controller 22 which indicates the position at which the switch unit 30 is placed. The message or signal is then employed by the occupant restraint controller 22 to electronically control the generation of squib pulses to the plurality of air bag modules 26a and b in a predetermined manner consistent with the position of the switch unit 30. More specifically, the disablement of a particular air bag module 26a and b is effected through software which inhibits the occupant restraint controller 22 from generating any squib pulses which would cause any of the charges in the particular air bag module 26a and b to ignite.

Advantageously, the remote indicator module 34 enables the air bag modules 26 to be selectively disabled without mechanically interrupting their respective squib circuits. This strategy maintains the integrity of the base system 14 and permits the occupant restraint controller 22 to perform diagnostic testing on any air bag modules 26 which have been disabled. Consequently, the remote indicator module 34 provides the vehicle occupant restraint system 10 with enhanced reliability.

The remote indicator module 34 is also operable for performing diagnostic testing on the vehicle occupant restraint system 10 to identify faults within the supplementary system 18 or in communication with the occupant restraint controller 22. Faults within the supplementary system 18 may include for example, open circuit or short circuit conditions which could inhibit the proper functioning of the vehicle occupant restraint system 10. If a fault is identified, the remote indicator module 34 logs the fault in the memory 136 of the microprocessor 132 and provides the occupant restraint controller 22 with a fault message or signal. In response to a fault message or signal, the occupant restraint controller 22 illuminates a vehicle restraint fault lamp 154 on the instrument panel of the vehicle to alert the vehicle occupants of the problem. The use of a single vehicle fault lamp 154 to alert vehicle occupants to the presence of a fault within either the base system 14 or the supplementary system 18 avoids confusion on the part of the vehicle occupants. Technicians who subsequently trouble-shoot the vehicle occupant restraint system 10 may utilize the memory and data storage capabilities of the occupant restraint controller 22 and remote indicator module 34 to identify whether the fault occurred in the base system 14 or the supplementary system 18.

From the forgoing, those skilled in the art should readily understand that the supplementary system 18 may be overlayed onto the base system 14 in a simple and reliable manner. Installation of the supplementary system 18 requires the mounting of the remote indicator module 34 and the switch unit 30, the connection of a first wire 158 to the vehicle power source (e.g., battery 146), the connection of a second wire 162 to the vehicle ground 150 and the connection of the link 140 to the occupant restraint controller 22.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An occupant restraint system for a vehicle, said occupant restraint system comprising:

an air bag module having an air bag and a first squib circuit;

an occupant restraint controller coupled to said first squib circuit and operable for generating a squib pulse to cause said first squib circuit to deploy said air bag;

a remote indicator module coupled to said occupant restraint controller; and a switch coupled to said remote indicator module, said switch movable between a first switch position and a second switch position, said switch producing a first switch position signal when placed in said first switch position and said switch producing a second switch position signal when placed in said second switch position, the switch also producing a switch-type signal indicative of the location of said air bag module which may be selectively disabled wherein a voltage of said switch-type signal is caused to vary depending on said location of said air bag module;

said remote indicator module receiving said first switch position signal and transmitting a first signal in response thereto, said occupant restraint controller receiving said first signal and not inhibiting said squib pulse from being generated;

said remote indicator module receiving said second switch position signal and transmitting a second signal in response thereto, said occupant restraint controller receiving said second signal and inhibiting said squib pulse from being generated to thereby disable said air bag module.

2. The occupant restraint system of claim 1, wherein said switch includes an identification resistor of a predetermined resistance operable for producing said switch-type signal with a predetermined voltage.

3. In a vehicle occupant restraint system having an air bag module and an occupant restraint controller operable for deploying said air bag module, an apparatus for selectively inhibiting deployment of said air bag, said apparatus comprising:

a remote indicator module; and a switch coupled to said remote indicator module, said switch movable between a first switch position and a second switch position, said switch producing a first switch position signal when placed in said first switch position and said switch producing a second switch position signal when placed in said second switch position, said switch also producing a switch-type signal indicative of the location of said air bag module which may be selectively disabled wherein a voltage of said switch-type signal is caused to vary depending on said location of said air bag module;

said remote indicator module receiving said first switch position signal and transmitting a first signal in response thereto, said first signal adapted for electronically permitting said occupant restraint controller to deploy said air bag module;

said remote indicator module receiving said second switch position signal and transmitting a second signal in response thereto, said second signal adapted for electronically inhibiting said occupant restraint controller from deploying said air bag module.

4. The apparatus for selectively inhibiting deployment of an air bag of claim 3, wherein said switch includes an identification resistor of a predetermined resistance operable for producing said switch-type signal with a predetermined voltage.

* * * * *